US010799070B2

(12) United States Patent
Koscak et al.

(10) Patent No.: US 10,799,070 B2
(45) Date of Patent: Oct. 13, 2020

(54) MIXING TOOL LOCK FOR A KITCHEN APPLIANCE

(71) Applicant: BSH HAUSGERATE GMBH, Munich (DE)

(72) Inventors: Ales Koscak, Postojna (SI); Marko Uplaznik, Prebold (SI); Simon Knez, Sempeter v Savinjski Dollini (SI)

(73) Assignee: BSH Hausgerate GmbH, Munich (DE)

( * ) Notice: Subject to any disclaimer, the term of this patent is extended or adjusted under 35 U.S.C. 154(b) by 319 days.

(21) Appl. No.: 15/547,568

(22) PCT Filed: Jan. 4, 2016

(86) PCT No.: PCT/EP2016/050017
§ 371 (c)(1),
(2) Date: Jul. 31, 2017

(87) PCT Pub. No.: WO2016/120021
PCT Pub. Date: Aug. 4, 2016

(65) Prior Publication Data
US 2018/0008098 A1    Jan. 11, 2018

(30) Foreign Application Priority Data
Jan. 30, 2015   (DE) ................. 10 2015 201 699

(51) Int. Cl.
*A47J 43/07*     (2006.01)
*B02C 18/18*     (2006.01)
*A47J 43/046*    (2006.01)

(52) U.S. Cl.
CPC ......... *A47J 43/0716* (2013.01); *A47J 43/046* (2013.01); *B02C 18/18* (2013.01)

(58) Field of Classification Search
CPC .................... A47J 43/0716; A47J 43/046
See application file for complete search history.

(56) References Cited

U.S. PATENT DOCUMENTS

| 4,889,248 | A | 12/1989 | Bennett |
| 2002/0176320 | A1* | 11/2002 | Wulf ............... A47J 43/042 366/205 |
| 2012/0006921 | A1 | 1/2012 | Maunoury et al. |

FOREIGN PATENT DOCUMENTS

| CN | 2805612 Y | 8/2006 |
| CN | 101327103 A | 12/2008 |

(Continued)

*Primary Examiner* — Elizabeth Insler
(74) *Attorney, Agent, or Firm* — Laurence A. Greenberg; Werner H. Stemer; Ralph E. Locher

(57) ABSTRACT

A mixing tool lock fixes a mixing tool in a container of a kitchen appliance, such as a stand mixer for kneading, mixing or grinding ingredients. The locking device includes a tool holder in which the mixing tool is rotatably mounted, and a fixing device for the tool holder. The tool holder also has a releasing device for releasing the mixing tool from the container. The locking device can be attached to the lower outside of a container having a bottom opening on the lower outside. The size of the opening corresponds at least to the diameter of the casing of the mixing tool so that the tool-side components of the mixing tool can be passed completely through the bottom opening from the outside. A kitchen appliance includes a drive, a housing that accommodates the drive, at least one mixing tool, and a container having the locking device.

16 Claims, 5 Drawing Sheets

(56) References Cited

FOREIGN PATENT DOCUMENTS

| | | |
|---|---|---|
| CN | 101658393 A | 3/2010 |
| CN | 103284625 A | 9/2013 |
| CN | 103976667 A | 8/2014 |
| CN | 203828772 U | 9/2014 |
| DE | 19539382 C1 | 1/1997 |
| EP | 1230883 A2 | 8/2002 |
| EP | 1731068 A1 | 12/2006 |
| EP | 2005869 A1 | 12/2008 |
| EP | 2404536 B1 | 8/2014 |
| WO | 0013563 A1 | 3/2000 |
| WO | 0024302 A1 | 5/2000 |

* cited by examiner

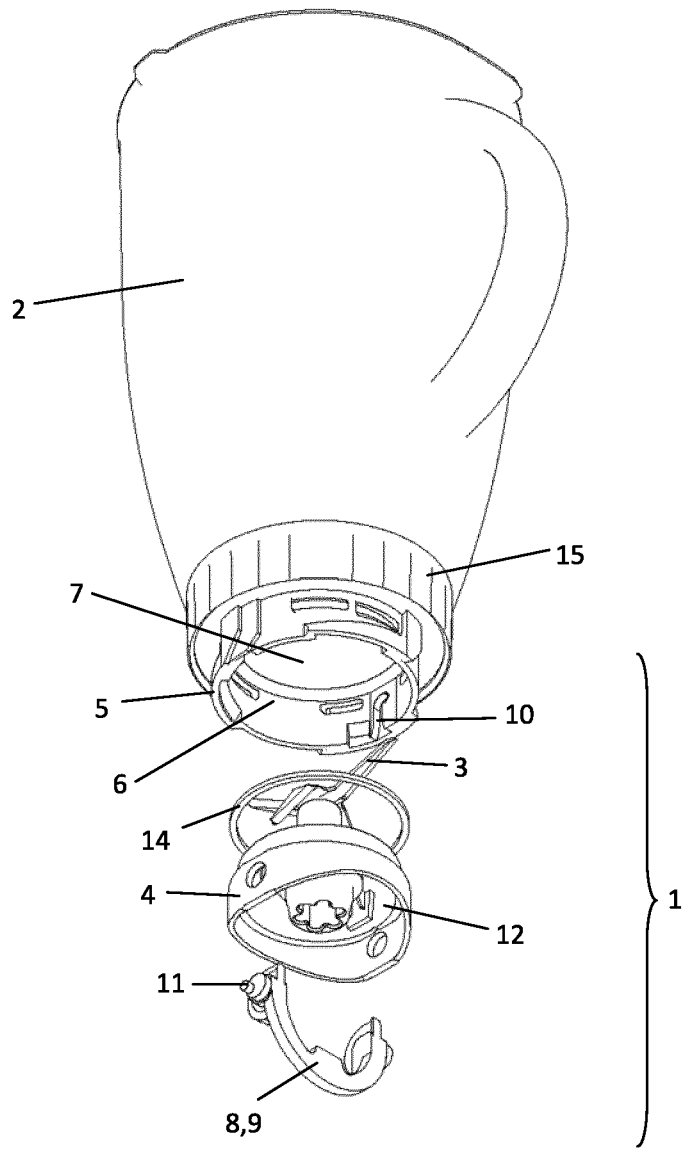

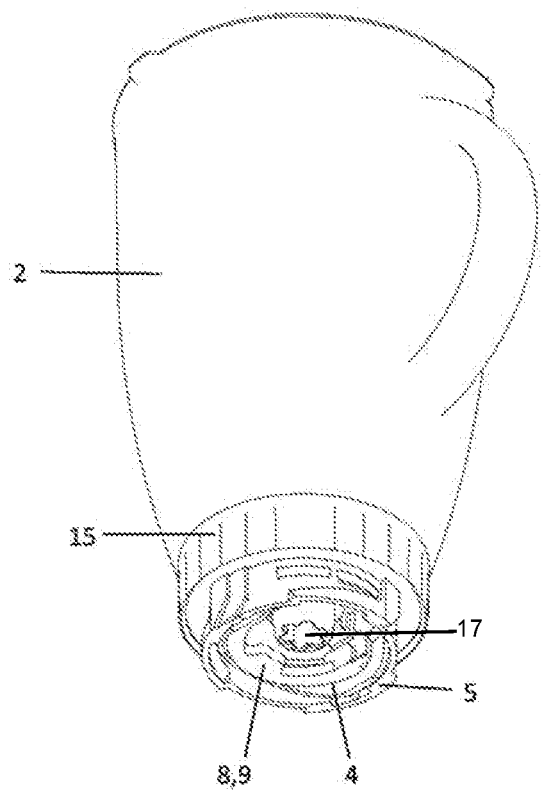
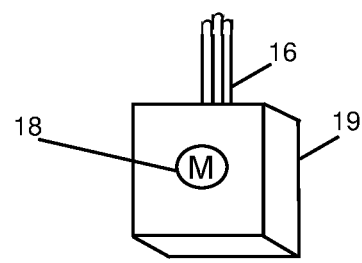

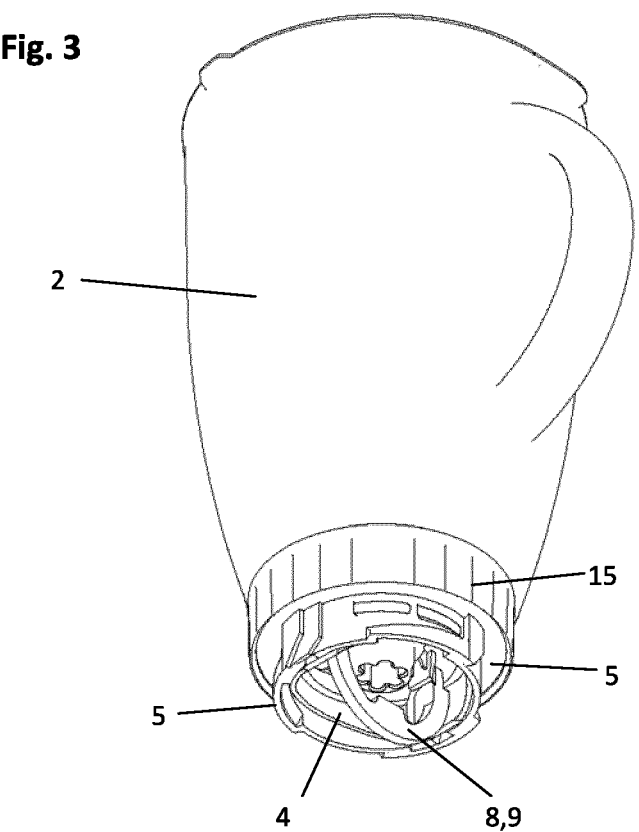

MIXING TOOL LOCK FOR A KITCHEN APPLIANCE

FIELD OF THE INVENTION

The invention relates to the field of kitchen appliances for kneading, mixing or grinding ingredients. More specifically, the invention relates to a mixing tool lock for a kitchen appliance, such as in particular a stand mixer.

BACKGROUND TO THE INVENTION

Kitchen appliances for mixing or grinding ingredients are well known from the prior art. The ingredients are initially placed in a container into which a mixing tool protrudes. The mixing tool, which is able to be driven by one or more shafts, may comprise one or more dough hooks, beaters or an arrangement of blades, depending on the task. By more or less rapid rotation of the mixing tool about one or two rotational axes, the ingredients are kneaded, beaten and/or ground, depending on the task. The rotation may take place in one or even both directions (unidirectional or bidirectional).

In addition to hand appliances, as are disclosed for example in the publication EP 1 230 883 A2, and in which the mixing tool and container are not connected together, stand appliances are used, in particular for longer operations. Such a device is shown, for example, in the publication DE 195 39 382 C1. In stand appliances, the mixing tool and container are connected together via a common housing. The mixing tool in this case protrudes from above into the container which is open at the top or the container has in its lower side a bottom opening through which the mixing tool is passed from above.

Seals ensure that the ingredients do not leave the container through the bottom opening. By means of a lock it is achieved that the mixing tool remains connected securely to the container during use.

After use, the mixing tool and container typically have to be cleaned. Cleaning the components together is frequently disadvantageous, however, when the mixing tools contain components which could be damaged when cleaned together with the container in the dishwasher. Preferably, therefore, the mixing tool and container are separated from one another before cleaning and cleaned individually.

The separation and/or the assembly takes place in this case preferably without special tools by means of simple mechanisms which are able to be operated manually. A stand appliance having a container and a manually actuatable locking mechanism for the mixing tool is disclosed in the publication EP 1 731 068 A1. For assembly, the mixing tool which is rotatably mounted in a tool holder has to be inserted from the top into the container, guided through the bottom opening and secured there, whilst from the lower side an annular counter support is positioned on the container lower side and over the mixing tool drive side, such that the fixing components of the counter support provided therefor may also actually interact with the retaining components present on the mixing tool drive side.

When releasing the mixing tool from the counter support, said counter support initially has to be unlocked, then it is removed from the container and the tool may be removed through the inside of the container. The unlocked counter support, however, may be easily dropped when removed; equally, the suddenly released mixing tool may fall into the container and be damaged or lead to injuries. The insertion of the mixing tool drive side through the bottom opening and simultaneously holding both the container and the counter support is awkward. Additionally, accurate positioning may be difficult, since the counter support may conceal the mixing tool drive side.

A further kitchen appliance is disclosed in the publication EP 2 404 536 B1, which comprises a container and a locking device, in which a tool holder is rotatably mounted. In this case, the locking device is designed such that it permits a separation of the locking device from the container only in a specific position of the container, and prevents and/or prohibits the separation of the locking device from the container in a different position therefrom, in particular a position in which the kitchen machine/the kitchen appliance is operated. As a result, an inadvertent release of the locking device from a container connected thereto may be ensured.

The Object Underlying the Invention

The object of the invention is to provide a locking device for the mixing tool of a kitchen appliance, which permits simple releasing of the mixing tool from the container and/or the assembly thereof on the container.

Solution According to the Invention

The object is achieved by a locking device as described below, and a kitchen appliance as is also described below. Advantageous embodiments may be derived from the sub-claims, the following description and the figures.

Directional information such as above, below, upper side and lower side are oriented relative to the typical positioning of the respective component in the installed position. In this case it is assumed that the locking device is located below the container which is able to be filled from above, said locking device in turn being arranged above a drive or a holder of the housing of the kitchen appliance receiving said locking device. "Axial" means parallel to the rotational axis (axes) of the mixing tool and "radial" denotes directions extending perpendicular thereto.

The locking device serves for fixing a mixing tool in the container of a kitchen appliance. In particular, dough hooks, beaters or blades are considered as mixing tools, which serve for kneading, beating and/or grinding the ingredients. The container is typically fixedly connected to the kitchen appliance, which preferably is a device configured as a stand appliance, such as a kneading machine, a mixing device ("mixer") or a grinding device ("crusher").

The locking device comprises a tool holder in which the mixing tool is rotatably mounted. In other words, the (mixing) tool holder serves for the rotatable mounting of the rotational shaft(s) of the mixing tool. The tool holder has a tool side facing the mixing tool and a drive side remote therefrom and facing a drive. The mixing tool also comprises a tool side and a drive side.

Moreover, the locking device comprises a fixing means of the tool holder. By these means the tool holder is fixed relative to the container so that in the fixed state it is neither axially or radially displaceable or rotatable relative to the container.

According to the invention, the tool holder is characterized in that it also has a releasing means provided for releasing the tool holder from the container, optionally with the mixing tool arranged thereon. This means accordingly serves specifically for securely gripping, holding and handling the tool holder, preferably with the mixing tool arranged thereon, during and after the release of the tool holder from the container. Thus the risk of inadvertently dropping the tool holder together with the tool is effectively prevented, this risk being present when handling the tool holder for mixing tools of kitchen appliances known from the prior art.

Preferred Embodiment of the Invention

Advantageous embodiments and developments which may be used individually or in combination with one another form the subject-matter of the dependent claims and are described hereinafter.

Preferably, the releasing means is a mechanical component receiving an axial force and forwarding said axial force to the tool holder. The axial forces may be provided by the hand of a user; by forwarding the axial forces to the tool holder it is able to be achieved that said tool holder may be pulled out of its seat after having been previously unlocked. A component receiving an axial force has the advantage that such forces may be provided directly and easily by a user who wishes to pull the tool holder out of the container. Additionally, the axial direction of movement corresponds to the direction of movement intuitively expected by the user, when releasing the tool holder.

According to a further embodiment, the releasing means is an electromagnetically operated component, in which the axial movement of the tool holder is produced by magnetic attracting forces and/or repelling forces between the tool holder and its seat. Such a releasing means has the advantage, for example, of also being able to be operated remotely or being lockable and unlockable by an electronic system present in the kitchen appliance.

According to a preferred embodiment of the locking device, the releasing means is a grip which is able to be stored in the peripheral region of the interior of the tool holder and connected to the tool holder. In particular, the tool holder may comprise a cavity which is accessible from the outside, in particular from the lower side of the tool holder remote from the container, and in which the releasing means designed as a grip may be accommodated or is accommodated. Such a grip has the advantage that it is able to be accommodated in a space-saving manner and advantageously is only visible when it is actually required.

According to a particularly preferred embodiment of the locking device, the grip is rotatably connected to the tool holder and is able to be folded out of said tool holder. By the rotational mounting of the grip in or on the internal wall of the cavity, said grip may be folded out by the user from the interior. Then the grip may receive tensile forces for pulling out the tool holder from its seat and preferably also conversely compressive forces for pushing in the tool holder into its seat, which may be provided manually by the user without the need of a tool. The rotational mounting is—in contrast to a plug-in or screw-in solution—a structure which is able to be particularly easily implemented.

Preferably, the grip is designed in an arcuate manner and particularly preferably in an approximately semi-circular shape and at both of its ends rotatably mounted in or on the inner wall of the cavity.

Preferably, the fixing means cooperates mechanically with a component fixedly receiving the tool holder, further details being provided below, and which provides a seat for the tool holder in which it is able to be fixed. A mechanical cooperation has the advantage that at no time is electrical energy, for example, required therefor.

According to a further embodiment, the fixing means cooperates by means of permanent magnets or electromagnetically with the component fixedly received by the tool holder. For producing the fixed state, permanent magnets which are initially spaced apart from one another may be moved mechanically or electromechanically into congruence. Electromagnets may be switched on by passing a current through and used for producing the forces required for the fixing. Accordingly, the advantage of such a solution may be seen to be in the possibility of it being able to be remotely actuated and/or activated by means of an electronic system provided in the kitchen appliance.

According to a further embodiment of the locking device, the fixing means comprises pins protruding radially over the tool holder, said pins being rotatable therein and mounted eccentrically. The pins are provided for engagement in corresponding recesses of the component fixedly receiving the tool holder. Due to the eccentric mounting, the axial spacing of the pin axes relative to the tool holder is altered during the rotation. If the pins are in engagement with the corresponding recesses, the rotation leads to an axial movement of the tool holder. Thus the tool holder and the component fixedly receiving said tool holder may be pressed against one another when locked in the axial direction. For the unlocking, the rotation of the fixing means may be carried out in the opposing direction. Such a construction is able to be implemented in a particularly simple manner and is robust. Additionally, such a construction provides in a simple manner forces acting in the axial direction, which may serve for pressing together the tool holder and the component fixedly receiving said tool holder.

Initially the container itself is considered as the component fixedly receiving the tool holder. In other words, the container itself has the corresponding recesses in the region of its lower side so that the tool holder is able to be directly connected to the container. According to a further embodiment, this component may be a counter support about which further details will be provided below.

According to a particularly preferred embodiment of the locking device, the fixing means and the releasing means are a common component. In other words, both functionalities are provided by a single component which accordingly is a mechanical component both receiving axial forces and conducting axial forces to the tool holder, and also a component which serves for the fixing, i.e. the locking and unlocking of the tool holder in the component receiving said tool holder. Accordingly, the component is particularly preferably designed as an arcuate grip which is able to be folded out from the peripheral interior of the tool holder and which also particularly preferably has at both of its ends the pins described further above. By rotating the grip out of the interior, it unlocks the tool holder from the component receiving said tool holder and then serves as a secure holding facility for easily pulling the tool holder out of its seat. In the same manner, the tool holder which is initially separated from the container may be positioned by means of the grip in the seat for the tool holder; by folding in the grip into the interior of the tool holder, the disclosed fixing is actuated so that the tool holder is fixed in its seat, i.e. the component receiving it fixedly, such as for example the container.

It is clear that it has to be ensured that the fixing means is able to remain in the respective end position, in particular in the fixing end position, even and in particular when the kitchen appliance is in operation. This may be achieved by a further mechanical means for blocking the rotation (for example a clamping device, latching lug, fixing screw), and/or by the interior of the tool holder being spatially limited after being mounted on the drive, such that an inadvertent actuation, such as for example unscrewing the fixing means, is no longer possible.

By combining the fixing means with the releasing means, a component is saved and also the grip movements to be carried out by a user are reduced, since an exchange is no longer required between different components when changing between the two functionalities (unlocking and releasing and/or bringing closer and locking). As a result, the safety in handling is also increased. Also, the operation of such a combined means is more intuitive.

According to one embodiment of the locking device, as already mentioned above, the component fixingly receiving the tool holder is the container (2). The advantage of such a construction is in the elimination of further components connecting/bridging the tool holder and the container. However, containers for kitchen appliances frequently consist of glass or metal, so that the provision of the aforementioned recesses into which the pins of the tool holder engage, or other mechanically-acting geometric features, may be challenging.

Therefore, according to a further embodiment, the locking device, as the component fixedly receiving the tool holder, additionally comprises a counter support which is able to be attached to the lower outer side of the container and which comprises a through-opening. The tool holder is able to be inserted into the counter support and it is able to be fixedly connected to the counter support. Thus, according to this embodiment, the counter support provides the seat for the tool holder. The advantage of this embodiment is that the container itself does not have to have any geometrically sophisticated features for fastening the tool holder. The counter support accordingly also serves as an adapter for the tool holder; thus also different types of tool holders are able to be easily connected to a single container, by in each case only the counter support and not the container having to be adapted.

Moreover, the through-opening of the counter support is preferably dimensioned such that the tool-side components of the mixing tool pass through completely. This is advantageous since the tool-side components of the mixing tool may be passed through the through-opening, not from one specific side but from both sides.

Provided the container has a bottom opening of at least similar dimensions to the through-opening, the counter support may remain on the container and the tool holder with the mixing tool may be moved toward said container from the lower outer side of the container and connected thereto. This provides a significant advantage relative to the prior art, in which an insertion of the tool holder with the mixing tool is only possible from the inner face of the container and through the typically small bottom opening which only permits the rotational shaft to pass through. This embodiment, therefore, provides a further improvement to the safety when handling the locking device according to the invention.

According to a preferred embodiment of the locking device with the counter support, a circumferential seal is arranged between the tool holder and the counter support. Since axially acting compressive forces are provided when locking the tool holder in the counter support, they may be used in order to compress the seal so that it is able to deploy the desired and advantageous sealing action. Naturally, a seal may also be provided in the case of the absence of a counter support, said seal then being preferably located in the region of the front faces of the container lower side and tool holder upper side.

Preferably, the counter support is able to be screwed or plugged onto the lower outer side of the container. Such fastenings are known from the prior art and have proved expedient over a long period. The container and counter support have either corresponding screw threads or, for example, are connected latchingly together in the manner of a bayonet connection. Such connections are robust, are able to be produced easily and are able to be cleaned easily.

Whilst the container may also consist of glass or metal, plastics is preferred as the material for the tool holder and the optionally present counter support, since the complex structures required for the respective connections are able to be produced more easily in plastics.

According to a further embodiment, the locking device on its lower side facing away from the container, i.e. on the drive side, comprises means for fastening to the housing of the kitchen appliance. In other words, the tool holder and/or optionally the counter support present provide the possibility of releasably cooperating directly with a corresponding receiver of the housing. To this end, in turn a screw, plug or latching connection may be used. Preferably, the actuation of this connection may be carried out without tools. The provision of such connecting means permits a simple and secure connection of the container to the kitchen appliance.

The invention further relates to a container for cooperating with a locking device according to the above description. Accordingly, the locking device is able to be attached to the lower outer side of the container, wherein the connection in turn is preferably able to be achieved by screwing-in, plugging-in or latching according to the manner described above and/or provides the geometric features required for the direct fixing of the tool holder.

Preferably, the diameter of the casing of the mixing tool is larger than the diameter of its rotational shaft. This means that the container, in particular, is able to be used advantageously if a mixing tool, which on the tool side is considerably wider than on the drive side, is present.

The container comprises a bottom opening on its lower outer side and as a result is characterized in that the size of the bottom opening corresponds at least to the diameter of the casing of the mixing tool, such that the tool-side components of the mixing tool are able to be passed completely through this bottom opening from the outside. As already mentioned above, this construction also permits an insertion of the tool holder from the outside. An awkward insertion thereof from the inside through the interior of the container is not required, however. To this end, reference is made to the above embodiments.

Finally, the invention also relates to a kitchen appliance for kneading, mixing and/or grinding ingredients, which is particularly preferably configured as a stand appliance. It comprises a drive for the mixing tool, a housing receiving said mixing tool and at least one mixing tool which, for example, may comprise dough hooks, beaters or an arrangement of blades.

The kitchen appliance preferably also comprises a container according to the above description, i.e. with a bottom opening allowing the tool-side components of the mixing tool to pass completely through from the outside.

Moreover, the kitchen appliance comprises a locking device, preferably according to the above description, which comprises the tool holder and optionally the counter support and is able to be attached to the housing.

Such a kitchen appliance has the advantage of easy handlability when fitting the mixing tool in the container and dismantling the mixing tool from the container. Also, the safety and convenience for the user are increased.

BRIEF DESCRIPTION OF THE DRAWINGS

FIG. 1 shows a perspective exploded view of the preferred embodiment of the locking device according to the invention;

FIG. 2 shows the locking device in the fixed state;

FIG. 3 shows the locking device in the unlocked state;

DETAILED DESCRIPTION WITH REFERENCE TO AN EXEMPLARY EMBODIMENT

Figure 4:
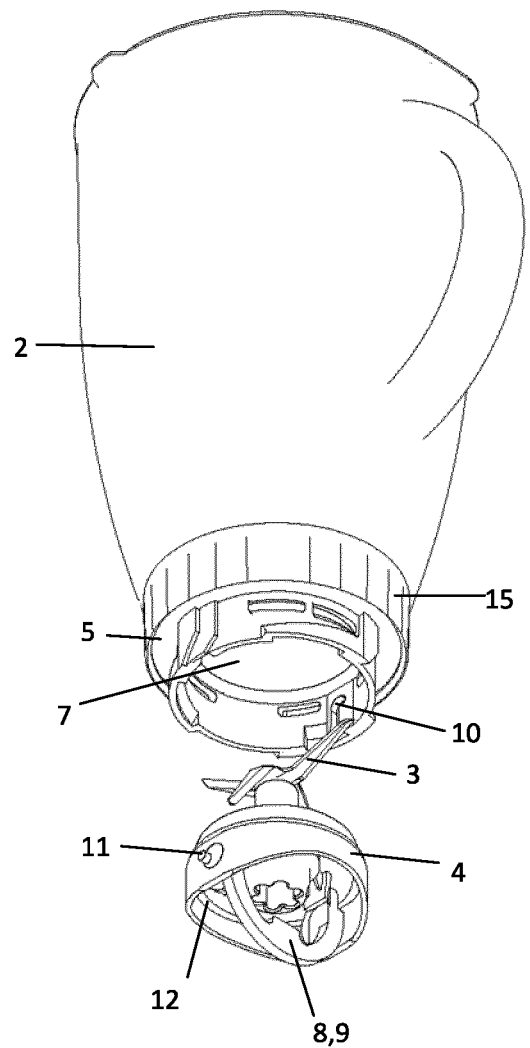
FIG. 4 shows the tool holder with the mixing tool pulled out of the counter support and FIG. 5 shows in a different perspective the locking device already shown in FIG. 2 in the fixed state.

FIG. 1 shows a perspective exploded view of the preferred embodiment of the locking device 1 according to the invention in order to fasten a mixing tool 3 to a container 2. Accordingly, the mixing tool 3 is arranged in a tool holder 4 and may rotate freely therein. By way of example, blades are arranged as the mixing tool on the tool side of the tool holder. The typical installed position, in which the tool holder 4 is located below the container 2, is shown in the drawing.

The fixing means 8 and the releasing means 9 are provided to be integrated and designed as an arcuate grip. This grip has at its two ends pins 11 which are able to be mounted rotatably and eccentrically in the tool holder 4. Clearly visible are the two receivers for this mounting which are located in the tool holder 4 as well as the eccentric arrangement of the pins 11 on the respective bearing. The grip is additionally dimensioned such that it is able to be received in the interior 12 of the tool holder 4.

On the lower outer side of the container 2 an annular counter support 5 is arranged as a component fixedly receiving the tool holder 4. The counter support 5 is connected fixedly but releasably to the container (connection not shown) and has recesses 10 corresponding to the pins 11. The counter support 5 thus forms a seat for the tool holder 4 which is able to be fixed in the counter support 5 by the fixing means 8. For secure handling of the counter support 5 when fastening to the container 2, the counter support has a knurled portion 15 to counteract slipping. Additionally, the through-opening 6 of the counter support 5 is dimensioned such that the tool-side components of the mixing tool 3 pass through said counter support.

A seal 14 is arranged between the counter support 5 and the tool holder 4. In the case of a tool holder 4 fixed in the counter support 5, the seal 14 is clamped and thus provides the desired sealing action. It is easily removable and thus cleanable and replaceable.

Structures shown in FIG. 2 including a shaft 16 to be inserted into a star-shaped opening 17 in the bottom of the mixing tool 3, are arranged on the drive side of the tool holder 4, said structures cooperating with a drive 18. As visible from FIG. 1, a bottom opening 7 is present on the lower side of the container 2. Said bottom opening is dimensioned so that the tool-side components of the mixing tool pass completely through said bottom opening. Thus the tool holder 4 with the mounted mixing tool 3 may be installed therein, by being advanced from the lower outer side of the container 2.

Figure 5:
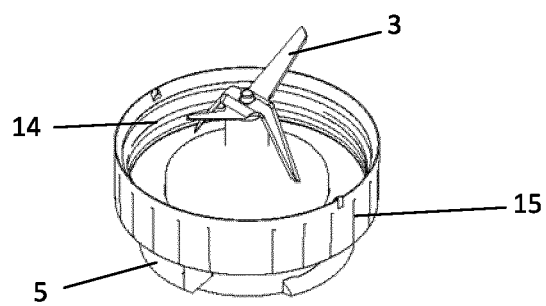

In FIG. 2 the locking device 1 is shown in the fixed state. As is visible, the arcuate grip, which at the same time is the fixing means 8 and the releasing means 9, is folded into the interior 12 of the tool holder 4 and fully received therein. The pins 11 protrude into the corresponding recesses 10 of the counter support 5 which in the embodiment shown is the component receiving the tool holder 4. By the folded-in position of the grip, the pins 11 are arranged in the recesses 10 so that an automatic release of the tool holder 4 from the counter support 5 is excluded. FIG. 5 shows how the tool is arranged in the fixed state of the locking device 1. Moreover, a means specifically configured as a thread in this exemplary embodiment for fastening the counter support to the container 2 (which is provided with a counter thread, not shown) may be seen in FIG. 5.

By folding out the grip shown in FIG. 3, the locking device 1 is in the unlocked state. The pins 11 are no longer in an automatically unreleasable engagement with the corresponding recesses 10 of the counter support 5, so that now it is possible to release the tool holder 4 with the mixing tool 3 mounted thereon. This is shown in FIG. 4 in which the tool holder 4 with the mixing tool 3 is shown pulled out of the counter support 5. Also, the bottom opening 7 of the container 2 which is dimensioned to be sufficiently large may be seen clearly here. Due to the construction according to the invention the tool holder 4 with the mounted mixing tool 3 may be attached from the outer side of the container 2; an engagement in the interior of the container 2 is not necessary.

LIST OF REFERENCE NUMERALS

1 Locking device
2 Container, fixedly receiving component
3 Mixing tool
4 Tool holder with tool side and drive side
5 Counter support, fixedly receiving component
6 Through-opening
7 Bottom opening
8 Fixing means
9 Releasing means
10 Corresponding recesses
11 Pins
12 Interior of tool holder
13 Means for fastening
14 Seal
15 Knurled portion
X Axial direction

The invention claimed is:

1. A locking device for fixing a mixing tool in a container of a kitchen appliance, the locking device comprising:
   a tool holder for rotatably mounting the mixing tool in said tool holder;
   said tool holder including a fixing device for connecting said tool holder to the container; and
   said tool holder including a releasing device for releasing said tool holder from the container, said releasing device being a grip rotatably connected to said tool holder and configured to be folded out of said tool holder, said grip having an arcuate shape, ends and pins on said ends, said grip being rotatable on said ends about a horizontal axis passing through said ends for folding said grip in and out of said tool holder.

2. The locking device according to claim 1, wherein said grip is a mechanical component receiving an axial force and forwarding said axial force to said tool holder.

3. The locking device according to claim 2, wherein said tool holder has an interior with a peripheral region, and said grip is configured to be stored in said peripheral region.

4. The locking device according to claim 1, wherein said fixing device cooperates mechanically with a component fixedly receiving said tool holder.

5. The locking device according to claim 4, wherein said fixing device includes said pins protruding radially over said tool holder, said pins are provided for engagement in corresponding recesses of the component fixedly receiving said tool holder, and said pins are rotatably and eccentrically mounted in said recesses.

6. The locking device according to claim 1, wherein said fixing device and said releasing device together form one common component.

7. The locking device according to claim 4, wherein said component fixedly receiving said tool holder is the container.

8. The locking device according to claim 1, which further comprises:
a counter support configured to be attached to a lower outer side of the container, said counter support having a through-opening formed therein;
said tool holder being configured to be inserted into said through-opening, and said tool holder being configured to be fixedly connected at said through-opening.

9. The locking device according to claim 8, wherein said through-opening of said counter support is dimensioned to permit tool-side components of said mixing tool to pass completely through said through-opening.

10. The locking device according to claim 8, which further comprises a circumferential seal disposed between said tool holder and said counter support.

11. The locking device according to claim 8, wherein said counter support is configured to be screwed or plugged onto the lower outer side of the container.

12. The locking device according to claim 1, wherein the locking device has a lower side facing away from the container, said lower side is configured for fastening to a housing of the kitchen appliance.

13. In a kitchen appliance including a mixing tool having a rotational shaft with a diameter, a casing with a diameter being larger than the diameter of the rotational shaft and tool-side components, a container comprising:
a lower outer container side having a bottom opening formed therein;
said bottom opening having a size corresponding at least to the diameter of the casing, permitting the tool-side components of the mixing tool to be introduced from outside completely through said bottom opening; and
a locking device according to claim 1 configured to be attached to said lower outer container side.

14. A kitchen appliance for at least one of kneading, mixing or grinding ingredients, the kitchen appliance comprising:
a drive;
a housing accommodating said drive;
at least one mixing tool to be driven by said drive; and
a container according to claim 13.

15. The locking device according to claim 1, wherein said grip only partially fills an interior of said tool holder in a folded in position of said grip.

16. The locking device according to claim 1, wherein said grip is completely inserted into an interior of said tool holder in a folded in position of said grip.

* * * * *